(No Model.)
F. W. NORTHROP.
BAIT PAIL.
No. 372,233. Patented Oct. 25, 1887.
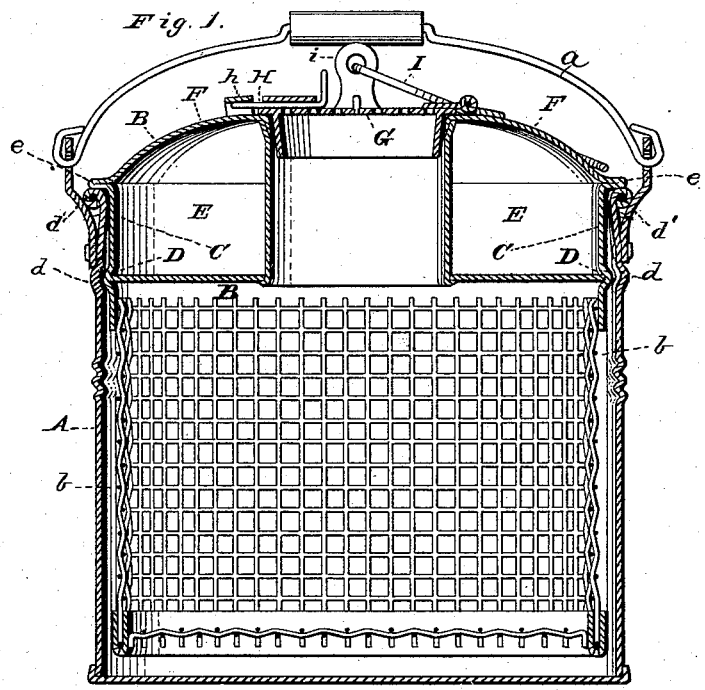
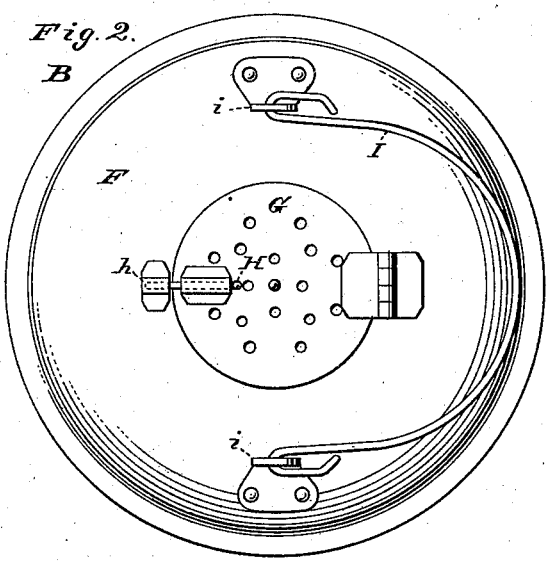
WITNESSES
Villette Anderson.
Philip C. Masi.
INVENTOR
Frank W. Northrop
by E. W. Anderson,
Attorney

UNITED STATES PATENT OFFICE.

FRANK W. NORTHROP, OF WHITE PIGEON, MICHIGAN.

BAIT-PAIL.

SPECIFICATION forming part of Letters Patent No. 372,233, dated October 25, 1887.

Application filed July 30, 1887. Serial No. 245,726. (No model.)

*To all whom it may concern:*

Be it known that I, FRANK W. NORTHROP, a citizen of the United States, and a resident of White Pigeon, in the county of St. Joseph and State of Michigan, have invented certain new and useful Improvements in Bait-Pails; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention and is a vertical section. Fig. 2 is a top view of the cage.

The invention is an improvement in floating pails, such as are used for keeping live bait while fishing; and it consists in the construction and novel combination of parts, as hereinafter described.

Referring to the drawings by letter, A designates an outside case, similar to an ordinary tin pail, and having a bail, $a$, by which to carry the device.

B is a cylindrical cage, of woven wire or perforated metal, which fits loosely inside of the case A, leaving a space, $b$, between itself and the case. At the top of the cage B is a circumferential plate, C, which forms the periphery of the air-chamber, hereinafter described, and fits closely in the top of the case, and has upon it a surrounding bead, D, which, when the cage is inserted in the case, springs into and holds within the concave inner surface of a circumferential bead, $d$, in the cover or pail A. Above the bead D, within the cage, is the closed circumferential annular air-chamber E, upon the convex top F of which is the hinged perforated door G, which is held closed, when desired, by the sliding bolt H engaging the holder $h$ on the top of said air-chamber. Around the top of the air-chamber is an outstanding circumferential flange, $e$, which rests on the top bead, $d'$, of the cover when the cage and air-chamber are inserted therein. The case thus surrounds both the cage and the air-chamber, and is held thereon by the engaging-beads D $d$, so that if, by mistake or inadvertence, the bail of the cage is taken hold of instead of the bail of the case, the case will probably not slip off the cage.

I is a bail, by means of which the cage can be removed from the case, and by means of the ears $i$ $i$, in which the bail is pivoted, the cage can be inserted in the cover.

The case may be made of any suitable material, such as tin, wood, or galvanized iron.

The spring-joint between the beads D and $d$ holds the cage and case so closely together that they have to be pulled apart.

When the cage is removed, the air-chamber in its upper part will cause it to float, while the wire-gauze or perforated metal, of which the lower part consists, allows the live bait to have free access to water and to the food in the water on which the said bait subsists. The cage will also, by exposing the bait within, attract other fish to its vicinity.

The device is carried on land by the handle $a$, so that the case can be kept full of water to keep the bait alive. When fishing, the cage is removed and dropped in the water to one side of the boat, being handled by its bail I. Should the cage turn over, the perforated door will prevent the bait from escaping. The fisherman opens said door to get bait when necessary.

Instead of the air-chamber E, the upper part of the cage may be made of cork, light wood, or other suitable substance that will float and keep the box upright while in the water.

I am aware that cages of woven wire or perforated metal, having an annular air-chamber on top, have been used in combination with an imperforate case, and such I do not claim, broadly.

Having described my invention, I claim—

The herein-described bait-pail, consisting of the imperforate case A, provided with the bail $a$ and circumferential bead $d$ at a suitable point, the cage of woven wire or perforated metal, the circumferential annular closed air-chamber E, secured to the top of the cage, provided with the circumferential bead D, to engage with the bead $d$ of the case, and having the convex top provided with the bail I, and the pivoted hinged door attached to the said convex top over its annular opening and closed by a suitable catch or bolt, substantially as specified.

In testimony whereof I affix my signature in presence of two witnesses.

FRANK W. NORTHROP.

Witnesses:
C. ROSENHEIMER,
WM. H. MIDDAGH.